Aug. 31, 1965    R. G. LEE    3,203,293

STRIP CUTTER WITH PHOTOELECTRIC CONTROL MEANS

Filed Feb. 28, 1962    3 Sheets-Sheet 1

INVENTOR.
Richard G. Lee
BY
Roberts, Cushman & Grover
ATT'YS

United States Patent Office 3,203,293
Patented Aug. 31, 1965

3,203,293
STRIP CUTTER WITH PHOTOELECTRIC CONTROL MEANS
Richard G. Lee, 47-A River St., Wellesley Hills 81, Mass.
Filed Feb. 28, 1962, Ser. No. 176,257
15 Claims. (Cl. 83—365)

This invention relates to apparatus for cutting strip material, and more especially to cutting a copy strip, on which photographs, documents, and the like, have been reproduced.

According to one method of reproducing items, such as photographs, documents, and the like, the items are placed in succession on an endless belt which moves them, one after another, into contact with a continuous length of sensitive paper, hereinafter call a "copy strip," for reproduction. In order to effect automatic cutting of the copy strip between successive items, a continuous mark is provided along the edge of the belt upon which the items are placed so that the mark is covered by the items except for the spaces between successive items. The exposed portions of the continuous mark are accordingly reproduced on the copy strip between items and will appear thereon as a mark of greater or lesser translucence than the strip itself, depending upon whether the copy strip is a transparency or an opaque. In using such apparatus, if the operator through inattention or purpose leaves a gap between successive items, a correspondingly long mark will appear on the copy strip. The principal object of this invention is to provide a cutter by means of which the copy strip may be cut to separate successive items, one from another, and also to cut out blank sections or gaps which have been left between successive items so as to leave a uniform margin, both at the edge of the item preceding the gap and that succeeding the gap.

The foregoing is accomplished herein by employing, in conjunction with a machine having a cutter and means for effecting movement of the strip material relative to the cutter, a detector responsive, on the one hand, to a change in the translucence of the strip of a predetermined minimum linear magnitude to effect a single operation of the cutter and, on the other hand, to a change in translucence of the strip of greater linear magnitude to effect operation of the cutter twice, once at the inceptive end and again at the terminal end. The detector is also operable in response to a change in translucence of the strip apart from the cut mark when a strip is fed into the machine, automatically to adjust itself to the mean density of the strip so as to maintain a balanced condition.

Figure 2:
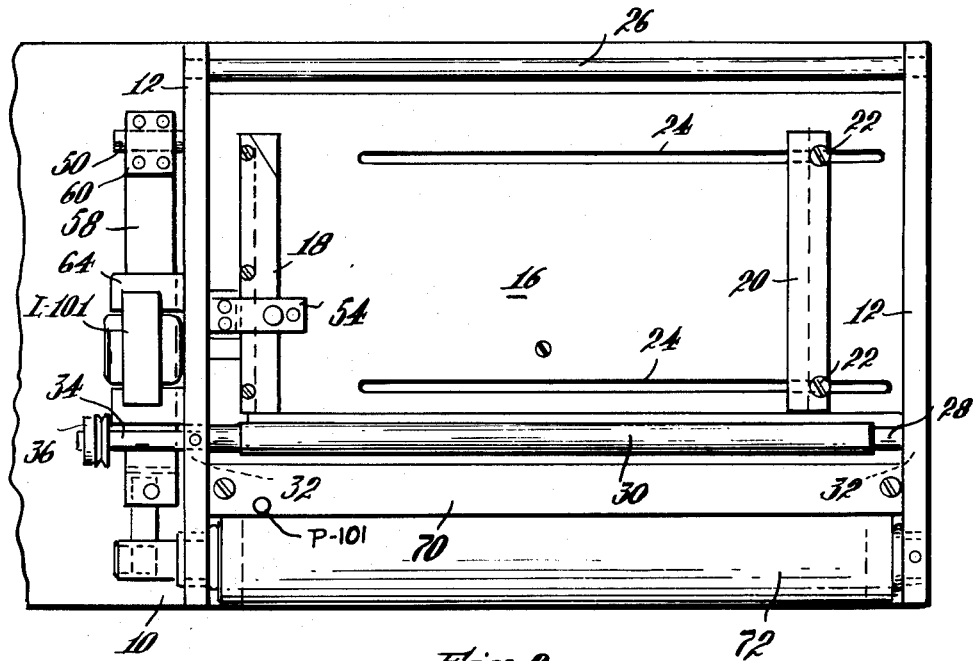
Figure 1:
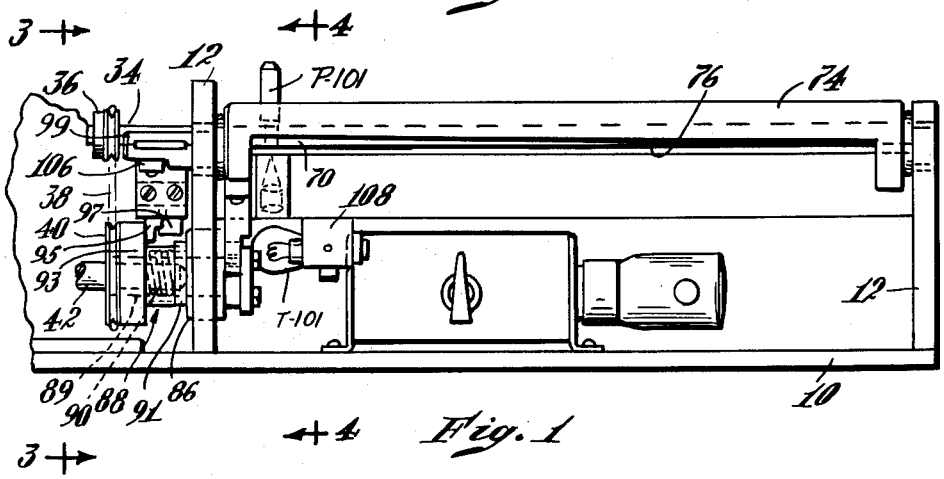
Figure 3:
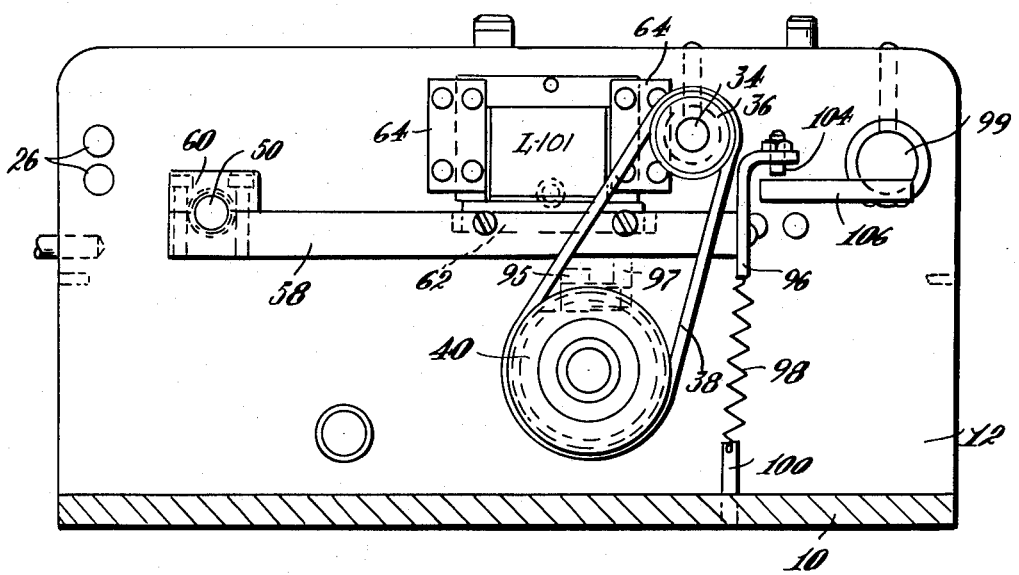
Figure 4:
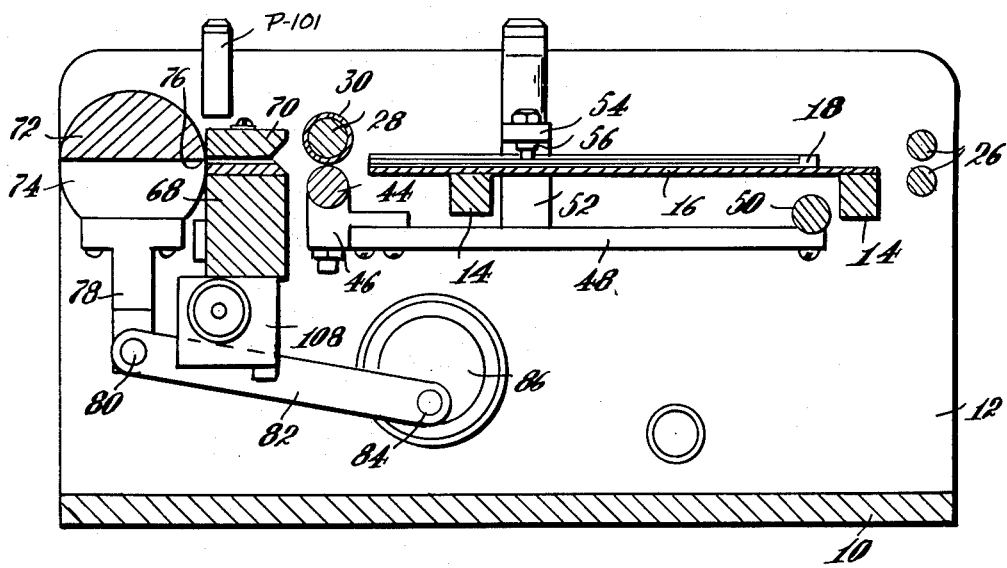
Figure 5:
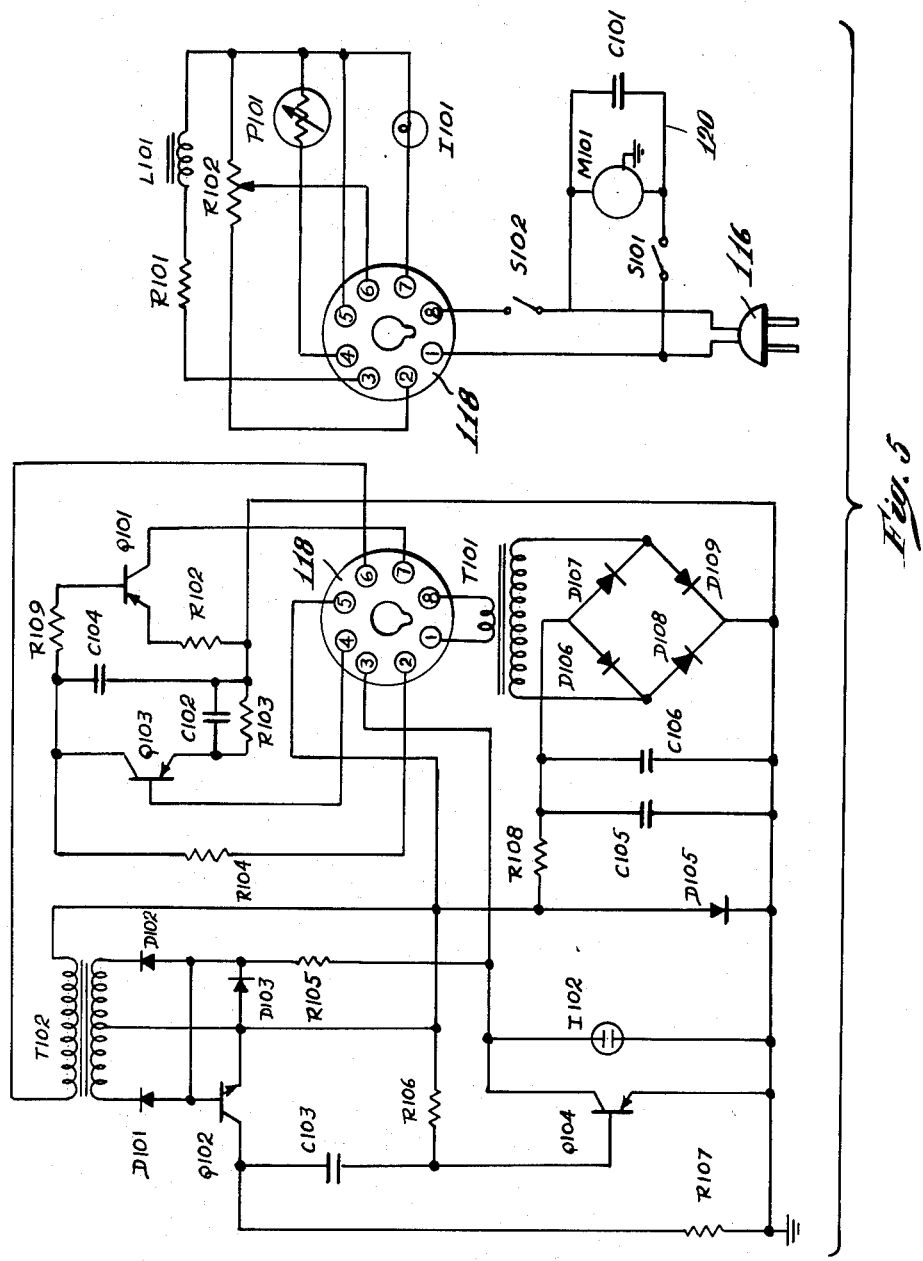

The invention will now be described in greater detail with reference to the accompanying drawings wherein:

FIG. 1 is a front elevation with part of the drive motor omitted;
FIG. 2 is a plan view of FIG 1;
FIG. 3 is a side elevation taken on the line 3—3 of FIG. 1;
FIG. 4 is a vertical section taken on the line 4—4 of FIG. 1; and
FIG. 5 is a wiring diagram.

Referring to the drawings (FIGS. 1 and 2), the machine comprises a flat rigid base 10 to which are fastened, in suitable manner, vertically disposed side walls 12—12. The base extends beyond the left wall 12, as seen in FIG. 1, to provide support for a drive motor M, a reduction unit and clutch, as will appear hereinafter. A pair of horizontally disposed tie bars 14—14 (FIG. 4) are fastened at their ends between the side walls 12—12 and provide support for a horizontally disposed platen 16. The platen has on its upper surface fixed and adjustable paper guides 18 and 20 (FIG. 2), the adjustable guides 20 being movable toward and away from the fixed guide 18 and adapted to be fixed at a given spacing therefrom by clamp screws 22—22, the heads of which are slidably engaged with spaced parallel, transversely disposed slots 24—24 in the platen.

A pair of guide rolls or rods 26—26 (FIG. 4) are mounted at the rear end of the platen 16 between the side walls 12—12 so that their contacting surfaces are at substantially the level of the surface of the platen for guiding paper or other strip material from a source onto the upper surface of the platen. At the forward end of the platen there is a feed roll 28 having on its surface a traction sleeve 30. The ends of the feed roll 28 are journaled in bearings 32—32 in the side walls and the left end of the feed roll has an extension 34 (FIG. 2), externally of the side wall at that side, on which there is fixed a pulley 36. A belt 38 (FIG. 3), entrained about the pulley 36, and a pulley 40 fixed to a drive shaft 42 therebelow, provides for driving the feed roll. An idler roll 44, is supported in parallel relation below the feed roll 28 for movement from a position in engagement with the underside of the feed roll to a position separated therefrom, on the one hand, to effect feeding movement of paper therebetween and, on the other hand, to discontinue such feeding. The ends of the idler roll 44 are supported in brackets 46—46 (FIG. 4) fastened to the forward ends of a pair of arms 48—48, the rear ends of which are fastened to a horizontally disposed shaft 50. The ends of the shaft 50 are journaled in the side walls 12—12. A post 52 is fastened to the left-hand one of the arms 48, projects upwardly between the arm and the wall 12 at that side above the surface of the platen and has, at its upper end, a transversely extending arm 54 in which there is a spring-loaded pin 56. The lower end of the pin has fixed to it a rubber tip for engagement with the paper on the platen when the idler roll 44 is separated from the feed roll 28 to prevent movement of the strip. During driving engagement of the rolls the rubber tip at the lower end of the screw 56 is held spaced from the surface of the platen and hence does not interfere with feeding movement of the paper.

The shaft 50 extends through the left-hand side wall 12 (FIGS. 2 and 3) and an arm 58 is mounted externally of the side wall 12 on the extending portion of the shaft 50 by a bearing cap 60 bolted to the rear end of the arm. A soft iron armature 62 (FIG. 2) is bolted to the supper side of the arm 48, forwardly of its rear end. A pair of supporting blocks 64—64 are bolted in spaced relation to the side wall 12 above the armature 62 on the arm 58 and support between them a coil L-101 which may be energized to attract the armature 62 and thus hold the arm 58 in a horizontal position, as shown in FIG. 2. In this position, the arms 48—48 are also held in a horizontal position so that the idler roll 44 is in driving engagement with the feed roll 28.

Forwardly of the feed roll 28 there is a horizontally disposed, transversely extending bar 68 (FIG. 4) of very rigid construction, fastened at its ends between the side walls 12—12, the upper surface of which has fastened to it a hardened steel plate. A guide bar 70 is disposed directly above the bar 68 in spaced parallel relation thereto, so as to provide a narrow slot through which the paper can be advanced by the feed rolls. A cylindrical cutter bar 72 is mounted forwardly of the bars 68 and 70 between the side walls, which has at its underside a notch 74 lengthwise thereof, providing a cutting edge 76 at its rear side, adjacent the upper edge of the bar 68 which slopes from left to right (FIG. 1). The cutter bar 72 is journaled at its ends in the side walls so that it may be rotated about its axis to move its cutting edge 76 in shearing relation to the upper edge of the bar 68. To effect rotation a T-shaped leg 78 (FIG. 4) is screwed to one end of the cutter bar so as to project downwardly therefrom. The lower end of the lug 78 is pivotally connected by a pin 80 to one end of a link 82, the opposite end of which is pivotally connected by a pin 84 to an eccentric shaft 86. The eccentric shaft 86 is journaled in the wall 12 at the left side (FIG. 1), extends therethrough and contains an axial opening within which an end of the drive shaft 42 is rotatably stepped. A clutch 88 is rotatably mounted on a reduced outwardly extending portion 89 of the eccentric shaft between a butt 91 thereon and the pulley 40.

The pulley 40 has adjacent to it a release disc 93 which is free to turn on the shaft 42. This disc has attached to it a lug 95 and one end of a spring 90. A lug 97 on the arm 58 holds the lug 95 from rotating which, in turn, holds spring 90 slightly unwound and so free to slip on the shaft 42. Thus the collar 91, which is fastened to the opposite end of the spring 90 and the eccentric shaft 86, which is fastened to the collar, are stationary. When the arm 58 rocks, the lug 97 allows the lug 95 to rotate. In such rotation, the spring diameter reduces slightly, causing it to grip firmly on the shaft 42. This causes the collar 93 and the eccentric 86 to rotate until the lug 97 again restrains the lug 95 from rotating.

The coil L–101 is de-energized only momentarily, accordingly the idler roll 44 is held out of contact with the feed roll 28 after the coil L–101 has been re-energized by a spring 98 (FIG. 3), one end of which is attached to a bracket 96 fastened to the forward end of the arm 58 and the other end of which is fastened to a stud 100 fixed to the base 10. In order to restore the idler roll 44 into feeding relation with the feed roll 28 and also to bring the soft iron armature 62 up to the coil L–101, the bracket 96 carries an adjustable pin 104 which overlies and bears against the upper side of an arm 106 fastened to a laterally extending portion 99 of the cutter bar 72. Consequently, when the cutter is moved back into its normal position after cutting, the arm 106 lifts the arm 58 so as to bring the armature 62 into engagement with the coil L–101 and, since the latter has become energized, as will appear hereinafter, the arm 58 will be supported in its horizontal position. Re-elevation of the arm 58 simultaneously re-elevates the idler roll 44 into driving engagement with the feed roll 28 and lifts the rubber tipped screw 56 away from the platen so that feeding is resumed.

In accordance with an important aspect of this invention, the control circuit for the machine is designed to effect operation of the cutter each time a division between successive items occurs, as indicated by a narrow cut mark of predetermined width at that point, and to effect operation of the cutter twice when the cut mark between successive items is of greater width, for example when there is a gap between successive items which is blank and it is desirable to cut out the blank and, at the same time, to preserve the normal margin at the rear edge of the preceding item and the forward edge of the succeeding item, the cuts being made once at the inceptive end of a mark and again at the terminal end thereof. This is accomplished by a detector and circuit therefor, which will be described hereinafter. It is desirable that the detector be responsive to cut marks of even greater or lesser density than the strip and that it also respond to a change in translucence of about the same order of magnitude regardless of the thickness or opaqueness of the particular copy strip which is being cut up at any given time.

To accomplish the foregoing, the circuit shown in FIG. 5 is employed, in which the detector takes the form of a photocell P–101 and a light cell I–101. These are located above and below the path of travel of the sheet material adjacent the left edge. The photocell P–101 is mounted on the guide bar 70, vertically above the light cell. The light cell I–101 (FIG. 1) is mounted on a support 108 fastened to the underside of the bar 68. A small hole 110 is drilled vertically through the guide bar 70, at the lower end of the photocell P–101. A second hole 112 of larger diameter is drilled through the guide bar 70 in axial alignment with the hole 110 so that its lower end is directly above the light cell I–101. Optionally, but not necessarily, a pair of lenses 114 are mounted in the hole 112 so as to focus the light cell I–101 on the photocell P–101.

Referring to the circuit (FIG. 5), a 115 volt, 60 cycle A.C. current is supplied from a conventional source through a jack 116 to a distributor 118. Between the jack and the distributor there is a motor circuit 120 containing the motor M–101 which drives the apparatus, a motor switch S–101 and a capacitor C–101. An amplifier switch S–102 is also placed between the jack and the distributor so that the motor can be run independently of the remainder of the circuit. The distributor 118 supplies the alternating current to a transformer T–101. The transformer T–101 converts the 115 volt, 60 cycle input to approximately 24 volts and this is rectified by a bridge circuit consisting of rectifiers D–106, D–107, D–108 and D–109. The output direct current voltage of the bridge circuit is filtered by capacitors C–105 and C–106 and, at this point, the voltage is approximately −30 volts. The voltage is further reduced by conducting it through a resistor R–108 to about −16 volts and is maintained constant at this voltage by a Zener diode D–105. The characteristic of the Zener diode is such that it will maintain a constant voltage if some current is maintained through it. Therefore, this voltage will remain constant at −16 volts even though the input power fluctuates from 115 volts. The effect of varying the input voltage only effects the current through the Zener regulator. Circuit constants are chosen so that this voltage is maintained at −16 volts even if the input line voltage is decreased to 90 volts. All of the remaining circuitry derives its power from this −16 volt point.

In order to preserve a substantially predetermined differential, regardless of the overall density of the strip being cut, the photocell P–101 and the light cell I–101 are designed to be self-balancing. To this end, a cadmium sulfide, non-polarized variable resistor type tube is employed, characterized in that it has a high resistance in the absence of light and low resistance in the presence of light. As shown, the photocell P–101 is directly connected to the base of the transistor amplifier Q–103 so that the base current of the amplifier is varied as the amount of light falling on the photocell P–101 is varied. The varying base current is amplified by the transistor amplifier Q–103 approximately 30 times at the collector of the transistor and is supplied to a power transistor amplifier Q–101 which is connected to the light cell I–101. Thus, at the inception of a rather dense strip of paper between the lamp and photocell, the base current in the transistor Q–103 is permanently reduced because the photocell resistance increases. The lower base current reduces the collector current of the transistor Q–103 thereby making this collector voltage point more negative. The more negative voltage increases the base current of the transistor Q–101 through the resistor R–109. This increase in base current is amplified and increases the collector current of transistor Q–101. Since the lamp I–101 is connected in series with the collector of the transistor Q–101, the lamp current increase thereby increasing the lamp intensity in proportion to the decrease in the light received by the photocell. The increased lamp intensity in effect then places the circuit in a stable condition similar to that before the paper was inserted.

The circuit consisting of the transistors Q–101 and Q–103 is a two-stage direct-coupled amplifier, connected so that a decrease in light reception at the photocell provides an increase in lamp intensity and vice versa. This is important because the paper to be cut can vary by great amount in thickness and translucence. This great range of "ambient light" that the photocell receives would necessitate a D.C. amplifier with a very great static range that would be difficult to attain especially if the signal to be amplified was to be maintained lineraly. The photocell, amplifier, lamp circuitry, shown herein, provides for this large ambient light range.

The varying base current of the amplifier Q–103, produced by response of the detector photocell to a change in translucence caused by the presence of a cut mark on the strip, is supplied by the transistor amplifier Q–103 to an interstage transformer T–102 through a potentiometer R–102, the latter providing means for adjusting the amount of the signal supplied to the transformer. The potentiometer is manually adjustable and is located on the control panel on the machine for this purpose.

Since, as pointed out above, the detector responds both to an increase and decrease in translucence, it will operate to produce a signal both at the inceptive and terminal ends of a mark on the copy strip and also to a mark when it is of greater or lesser density than the strip. In the case of narrow cut mark, the two signals are so close together that they operate as one and the cutter is operated only once, however, in the case of a long mark the two signals operate to stop the feed and operate the cutter twice so as to cut the strip both at the inceptive and terminal ends of the mark, and hence to cut out a blank section.

The signals produced by the photocell are transmitted by the amplifier Q–103 to the primary coil of the transformer T–102 through the potentiometer R–102 and, in phase inverted form, from the center tapped secondary coil through two diodes D–101 and D–102 which are 180° out-of-phase, so that signals will be obtained which are of negative polarity whether the light is decreasing or increasing.

The signals produced by the transformer T–102 and converted to the same sense by the diodes D–101 and D–102 operate through two transistors Q–102 and Q–104 connected together in a regenerative manner in a one-shot multivibrator circuit employing complementary symmetry so that the negative signal applied to the base of the transistor Q–102 triggers the cutter circuit for a preset time interval. The transistors Q–102 and Q–104 are both normally in full conduction. The negative signal applied to the base of the transistor Q–101 turns this transistor off, thereby producing a positive signal at its collector, whereupon this positive signal is applied to the base of the transistor Q–104, turns it "off" and procedures a negative signal at its collector. This latter negative signal is applied through a resistor R–106, to the base of the transistor Q–102, tending to accelerate and complete its turning off. Transistor Q–104 is also turned "off" completely. The capacitor C–103 is now re-charged through resistor R–106 and as it recharges the voltage at the base of the transistor Q–104 rises and when this voltage reaches ground potential, transistor Q–104 turns back "on." As soon as transistor Q–104 conducts it will turn "on" transistor Q–102 by way of resistor R–106 until both transistors are in their natural state of full conduction. It is to be observed that the signal as attained from the transformer T–102 need only be a certain minimum amplitude to trigger the transistors Q–102 and Q–104 for a specified length of time as determined primarily by the resistor R–106 and capacitor C–103. While the transistors Q–102 and Q–104 are in their "off" states, the multivibrator circuit is not responsive to additional pulses supplied by the secondary of the transformer T–102 so that short marks on the strip, which produce closely spaced pulses from the transformer, can initiate only one operation of the cutter. By employing marks between successive items of the copy strip of about ⅛ inch, the time interval between the two signals is so short that only one operation of the cutter circuit is initiated. However, when the cut mark is in the order of ⅜ inch, assuming that the speed of movement of the strip remains constant, two distinct signals will be produced, to each of which the cutter circuit will respond. The collector of the transistor Q–104 is also connected to the coil L–101 which releases the armature 62 thereby initiating the cutting operation. The coil L–101 is de-energized for a fixed interval of time, which is not dependent upon the time characteristic of the cutting signal, which obviously varies with rates and physical nature of the cutting marks.

It should be understood that the present disclosure is for the purpose of illustration only and that this invention includes all modifications and equivalents falling within the scope of the appended claims.

I claim:

1. In a machine for cutting strip material bearing cut marks, feeding means for effecting movement of the strip material along a predetermined path, a cutter disposed transversely of the path of movement of the strip, and a detector disposed adjacent the path of movement of the strip, said detector being characterized in that it is responsive to a change in light falling thereon of decreasing or increasing intensity, to produce a signal, a circuit for rendering the feeding means inoperative and effecting operation of the cutter in response to each signal, and means for supplying the signals to said circuit, said last-named means being characterized in that it operates, when the time interval between successive signals is of a predetermined minimum length, to supply one and only one signal to said circuit.

2. A machine according to claim 1, further characterized in that when the time interval is of greater length said last-named means operates to supply two signals to the circuit.

3. A machine according to claim 2, wherein each signal delivered to said circuit initiates its operation and wherein the operation of said circuit is completed independent of the interval between signals delivered thereto.

4. In a machine for cutting strip material having cut marks thereon of predetermined minimum length and of greater length, feeding means for effecting movement of the strip material along a predetermined path, a cutter disposed transversely of the path of movement of the strip, a detector disposed adjacent the path of movement, said detector being characterized in that it is responsive to a mark of predetermined length to render the feeding means inoperative and operate the cutter once, and in response to a mark of greater length to render the feeding means inoperative and effect operation of the cutter once at the inceptive end of the mark and again at the terminal end of the mark.

5. In a machine for cutting strip material having cut marks thereon of predetermined minimum length and of greater length, feeding means for effecting movement of the strip material along a predetermined path, a cutter disposed transversely of the path of movement of the strip, sensing means disposed adjacent the path of movement of the strip including a primary circuit containing the primary coil of a transformer, said sensing means being operable, by a change in the density in the strip, to produce a current pulse in the primary of the transformer, a secondary circuit containing means for effecting operation of the cutter, said secondary circuit being connected to the secondary coil of the transformer and operable, by reception of a pulse of predetermined sense from said secondary coil, to effect operation of the means for effecting operation of the cutter, and means in the secondary circuit operable to convert the signals from the primary coil of the transformer to the same sense.

6. In a machine for cutting strip material having cut marks thereon of predetermined minimum length and of greater length, feeding means for effecting movement of the strip material along a predetermined path, a cutter disposed transversely of the path of movement of the strip, a circuit containing the primary coil of a transformer, sensing means in the circuit operable, by a change in the density of the strip, to effect a change in the current flow in the circuit of increasing or decreasing amount, to produce a pulse in the primary coil of the transformer, a secondary circuit, means in the secondary circuit for effecting operation of the cutter, said secondary circuit being connected to the secondary coil of the transformer, and means in the secondary circuit operable to convert pulses from the primary coil of the transformer to the same sense.

7. In a machine for cutting strip material having cut marks thereon of predetermined minimum length and of greater length, feeding means for effecting movement of the strip material along a predetermined path, a cutter disposed transversely of the path of movement of the strip, a detector including a photocell and a light cell situated at opposite surfaces of the strip, said photocell being characterized in that it operates in response to a mark of predetermined minimum length to render the feeding means inoperative and to effect operation of the cutter once, and in response to a mark of greater length to render the feeding means inoperative and the cutter means operative once at the inceptive end of the mark and again at the terminal end of the mark.

8. In a machine for cutting strip material bearing cut marks thereon of predetermined minimum length and of greater length, feeding means for effecting movement of the strip material along a predetermined path, a cutter disposed transversely thereof, a detector, said detector being characterized in that it is responsive to a mark of predetermined minimum length to produce substantially concurrent signals of opposite sense and to a mark of greater length to produce separate signals of opposite sense, means operable to change the signals to the same sense and a circuit operable, in response to each signal, to render the feeding means inoperative and the cutter operative.

9. Apparatus according to claim 8, wherein a pair of diodes 180° out-of-phase are provided for converting the signals of opposite sense to the same sense.

10. In a machine for cutting strip material of predetermined density bearing cut marks thereon of predetermined different density than the strip, feeding means for effecting movement of the strip along a predetermined path, a cutter disposed transversely thereof, and a normally balanced detector circuit including a photocell and a light cell, said photocell being operable, in response to the decrease in the light falling thereon due to the presence of a strip moving between the photocell and the light cell, to increase the light supplied to the light cell by an amount to compensate for the decrease in light, and being further operable, in response to the different density of the cut marks, to render the feeding means inoperative and to effect operation of the cutter each time the inceptive and terminal end of a cut mark passes between it and the light cell.

11. In a machine for operating on a moving material strip, a control system comprising: a photocell; a lamp illuminating said photocell through the strip; a normally balanced detector circuit including means, responsive to the mean level of illumination received by said photocell, for controlling the light supplied by said lamp so as to maintain the balanced condition and means, responsive to abrupt changes in the level of illumination received by said photocell, for initiating the operation of the machine.

12. In a machine for operating on a moving material strip, a control system comprising: a photocell adjacent the strip; a lamp adjacent the strip for illuminating said photocell; a detector circuit including means, inversely responsive to the mean level of illumination received by said photocell, for controlling the light supplied by said lamp so as to maintain substantially constant the mean level of illumination received by said photocell and means, responsive to abrupt change in the level of illumination received by said photocell, for initiating the operation of the machine.

13. In a machine for operating on a moving material strip, a control system comprising: a photocell; a lamp illuminating said photocell through the strip; a detector circuit including means, responsive to abrupt changes in the level of illumination received by said photocell, for providing simultaneous electrical pulses of opposite phase, means for rectifying said pulses so that a pulse of a predetermined polarity is available at each abrupt change in illumination without regard for the direction of said change, and means responsive to said rectified pulses for initiating operation of said machine.

14. In a machine for operating on a moving material strip, a control system comprising: a photocell adjacent the strip; a lamp adjacent the strip for illuminating said photocell in a manner dependent on the character of the strip; and a detector circuit including means, responsive to abrupt changes in the level of illumination received by said photocell, for providing simultaneous electrical pulses of opposite phase, means for rectifying said pulses, and a one-shot multivibrator, responsive to said rectified pulses, for providing a signal of predetermined duration for initiating operation of said machine, said multivibrator being unresponsive to further rectified pulses occurring during such a duration.

15. In a machine for operating on a moving strip of predetermined density bearing cut marks thereon of predetermined different density than that of the strip; feeding means for effecting movement of the strip material along a predetermined path; a cutter disposed transversely of the path for cutting the strip and a control system comprising a photoelectric cell; a lamp illuminating said photoelectric cell through the strip; a normally balanced detector circuit including means, responsive to the mean level of illumination received by said photoelectric cell, for controlling the light supplied by said lamp so as to maintain the balanced condition; and means, responsive to abrupt changes in the level of illumination received by said photoelectric cell when said cut marks pass between the photoelectric cell and lamp for rendering the feeding means inoperative and the cutter operative.

References Cited by the Examiner

UNITED STATES PATENTS

| | | | |
|---|---|---|---|
| 2,246,680 | 6/41 | Harrison | 250—210 |
| 2,674,308 | 4/54 | Knobel | 83—365 |
| 2,685,664 | 8/54 | Visconti | 83—365 |
| 3,029,346 | 4/62 | Ichizo Vehida et al. | 250—213 |

ANDREW R. JUHASZ, *Primary Examiner.*

HUNTER C. BOURNE, JR., *Examiner.*